(12) United States Patent
Yamaguchi et al.

(10) Patent No.: US 12,018,737 B2
(45) Date of Patent: Jun. 25, 2024

(54) CONTINUOUSLY VARIABLE POWERTRAIN DEVICE FOR WORK VEHICLE AND WORK VEHICLE INCLUDING THE SAME

(71) Applicant: KUBOTA CORPORATION, Osaka (JP)

(72) Inventors: Tetsuo Yamaguchi, Sakai (JP); Ryoma Iwase, Sakai (JP); Tomonari Tsuchida, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/503,414

(22) Filed: Nov. 7, 2023

(65) Prior Publication Data

US 2024/0167549 A1 May 23, 2024

(30) Foreign Application Priority Data

Nov. 17, 2022 (JP) ................................ 2022-184323
Nov. 17, 2022 (JP) ................................ 2022-184328

(51) Int. Cl.
*F16H 37/08* (2006.01)

(52) U.S. Cl.
CPC ... *F16H 37/084* (2013.01); *F16H 2037/0886* (2013.01)

(58) Field of Classification Search
CPC .. F16H 2037/0886; F16H 47/04; F16H 59/36; F16H 2059/366; F16H 59/38; F16H 2061/1284

See application file for complete search history.

(56) References Cited

U.S. PATENT DOCUMENTS

| | | | | |
|---|---|---|---|---|
| 4,849,899 A | * | 7/1989 | Cote | B27K 3/22 477/906 |
| 7,110,869 B2 | * | 9/2006 | Tao | G05B 9/03 180/65.6 |
| 8,096,912 B2 | * | 1/2012 | Hiraoka | B60K 17/08 475/209 |
| 2019/0039577 A1 | * | 2/2019 | Nishimura | F16H 63/50 |
| 2022/0196128 A1 | | 6/2022 | Yamaguchi et al. | |

FOREIGN PATENT DOCUMENTS

| | | | |
|---|---|---|---|
| JP | 2019214283 A | * | 12/2019 |
| JP | 2022-096208 A | | 6/2022 |

* cited by examiner

*Primary Examiner* — Sherry L Estremsky
(74) *Attorney, Agent, or Firm* — Keating & Bennett, LLP

(57) ABSTRACT

A continuously variable powertrain device for a work vehicle includes a continuously variable transmission to output a continuously shifted motive power while continuously varying a speed of a motive power received from an engine, a planetary transmission to receive the motive power from the engine and the continuously shifted motive power and to output a compound motive power, a planetary clutch to switch a shift level of the planetary transmission a forward-reverse direction switch to receive the compound motive power and to output either a forward motive power or a reverse motive power, rotation detectors, and a powertrain controller.

17 Claims, 6 Drawing Sheets

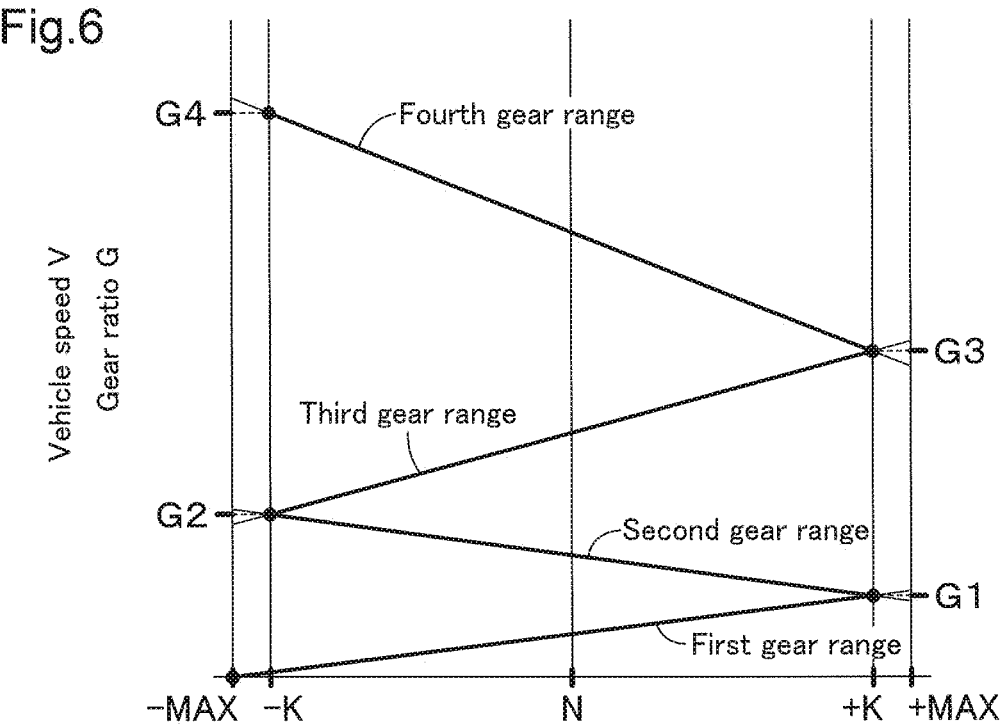

CONTINUOUSLY VARIABLE POWERTRAIN DEVICE FOR WORK VEHICLE AND WORK VEHICLE INCLUDING THE SAME

CROSS REFERENCE TO RELATED APPLICATIONS

This application claims the benefit of priority to Japanese Patent Applications No. 2022-184323 and No. 2022-184328 both filed on Nov. 17, 2022. The entire contents of each application are hereby incorporated herein by reference.

BACKGROUND OF THE INVENTION

1. Field of the Invention

The present invention relates to a continuously variable powertrain device for a work vehicle and a work vehicle including the same.

2. Description of the Related Art

A continuously variable powertrain device in which a continuously variable transmission and a planetary transmission are combined (also called a hydraulic mechanical transmission) is utilized for work vehicles such as a wheel loader, tractor, etc. In a conventional continuously variable powertrain device disclosed in Japanese Patent Application Publication JP2022-096208A as an example, a motive power output from an engine is branched to a hydraulic pump of a continuously variable transmission and a planetary transmission, and the planetary transmission receives a continuously shifted motive power output from a shaft of a hydraulic motor of the continuously variable transmission. In such a conventional continuously variable powertrain device, the planetary transmission receives the motive power from the engine and the continuously shifted motive power from the continuously variable transmission and transmits an output motive power with a selected shift level (selected from an internal gear, a planetary gear, and a carrier) thereof to downstream devices. A certain shifted motive power is obtained by changing the continuously shifted motive power of the continuously variable transmission received by a sun gear of the planetary transmission and changing the shift level of the planetary transmission selectable from the internal gear, the planetary gear, and the carrier. Therefore, it is important to detect output rotation speed of the engine, output rotation speed of the continuously variable transmission, and output rotation speed of the planetary transmission in real time for an optimum shift control. In a case that at least one of rotation detectors (rotation sensors or rotation speed sensors) detecting output rotation speed of the engine, output rotation speed of the continuously variable transmission, and output rotation speed of the planetary transmission, etc., which speeds are important factors for continuously variable control, become out of order, it is impossible to perform the shift control accurately. For this reason, what is called a fail-safe is necessary to duplicate the rotation detector with multiple rotation detectors. However, even in a case of the rotation detector duplicated with the multiple rotation detectors, it is necessary to examine a rotation speed of any other components in the continuously variable powertrain device to determine which one of the multiple rotation detectors is in an abnormal state when an abnormality of a detection signal of the rotation detectors occurs, and it is not easy to make the determination accurately and promptly.

SUMMARY OF THE INVENTION

Preferred embodiments of the present invention provide technologies to accurately and promptly determine the abnormality of the duplicated detectors that detect the rotation speed required to perform stepless shift control in the continuously variable powertrain device including the combination of the continuously variable transmission and the planetary transmission and in a work vehicle using such a device. Furthermore, a challenge of preferred embodiments of the present invention is to properly detect the rotation speed of each transmission element to perform an efficient stepless shift control in the continuously variable powertrain device including the combination of the continuously variable transmission and the planetary transmission and in the work vehicle using such a device, and to obtain a fail-safe by detecting the rotation speed from the multiple rotation detectors.

A continuously variable powertrain device for a work vehicle according to a preferred embodiment of the present invention includes a continuously variable transmission to output a continuously shifted motive power while continuously varying a speed of the motive power received from the engine, a planetary transmission to receive the motive power from the engine and the continuously shifted motive power and to output a compound motive power, a planetary clutch mechanism to switch a shift level of the planetary transmission, a forward-reverse direction switch to receive the compound motive power and to output either a forward motive power or a reverse motive power, a rotation detector group including a plurality of rotation detectors to detect an engine rotation speed, a continuously variable rotation speed, a composite rotation speed and a travel rotation speed, the engine rotation speed being an output rotation speed of the engine, the continuously variable rotation speed being a rotation speed of the continuously shifted motive power, the composite rotation speed being a rotation speed of the compound motive power, the travel rotation speed being a rotation speed of either the forward motive power or the reverse motive power, and a powertrain controller configured or programmed to generate a control signal to control actuation of the continuously variable transmission, the planetary transmission, and the forward-reverse direction switch based on a shift command with utilizing the engine rotation speed, the continuously variable rotation speed, the composite rotation speed, and the travel rotation speed, and function as a determiner to determine whether or not the rotation detector group is in an abnormal state by using at least one determination rule selected from a plurality of abnormality determination rules based on an operation condition with the planetary clutch mechanism and an operation condition the forward-reverse direction switch.

According to this configuration, the determiner determines whether or not the rotation detector group is in an abnormal state and is provided with the plurality of abnormality determination rules to be selected based on respective operation conditions with the planetary clutch mechanism and the forward-reverse direction switch. The determiner applies the continuously variable rotation speed, composite rotation speed, and travel rotation speed detected by the rotation detector group to the abnormality determination rule to determine whether or not the rotation detector group is in an abnormal state. Appropriately selecting one of the abnormality determination rules enables the determination of the abnormality of the duplicated rotation detectors accurately and promptly no matter what a shift condition of the continuously variable powertrain device is.

In a preferred embodiment of a continuously variable powertrain device according to a preferred embodiment of the present invention, the determiner is configured or programmed to select the determination rule and determine whether or not the rotation detector group is in an abnormal state based on the engine rotation speed.

Although the work vehicle usually keeps a constant engine rotation speed during the work, a suitable engine rotation speed varies depending on work contents, conditions of work fields, etc. Since a motive power received by the continuously variable powertrain device firstly is the motive power by the engine, the engine rotation speed is a basic rotation speed for the continuously variable powertrain device. Hence, the engine rotation speed is important in the determination of the abnormality of the rotation detector group detecting the rotation speed in each area of the continuously variable powertrain device.

Because countermeasures to be taken depending on types and situations of the rotation detectors which has been determined to be in an abnormal state, in one preferred embodiment of the continuously variable powertrain device of the present invention, the determiner is configured or programmed to classify the abnormality of the rotation detector group as a first abnormal condition for which only a warning notification is to be performed, a second abnormal condition for which a temporary travel is allowed, or a third abnormal condition for which an emergency stop is to be performed.

In a preferred embodiment of a continuously variable powertrain device according to a preferred embodiment of the present invention, the rotation detector group includes a first engine rotation detector to detect the engine rotation speed, a second engine rotation detector to detect a rotation speed of an input shaft receiving the motive power from the engine as the engine rotation speed, a continuously variable rotation detector to detect the continuously variable rotation speed, a first composite rotation detector to detect the composite rotation speed, a second composite rotation detector to detect the composite rotation speed, a first travel rotation detector to detect the travel rotation speed, and a second travel rotation detector to detect the travel rotation speed.

The engine rotation speed is strictly managed by an engine controller. Hence, a rotation detection function managed by the engine controller is usable as the first engine rotation detector. However, a communication receiving the engine rotation speed from the engine controller might be lost due to a communication failure on a data transmission line from the engine controller to the determine. The second engine rotation detector to detect a rotation speed of the input shaft of the continuously variable powertrain device is provided. Therefore, second engine rotation detector functions as a backup detector of the first engine rotation detector. It is possible to calculate the output rotation speed of the planetary transmission based on the input rotation speed of the planetary transmission (continuously variable rotation speed) and the operation condition of clutches of the planetary transmission. This means that the abnormality of the continuously variable rotation detector, the first composite rotation detector, and the second composite rotation detector can be determined by logical operations such as a majority rules. Note that a redundant continuously variable rotation detector to detect the continuously variable rotation speed is omitted in this case. In a case of at least one of clutches of the forward-reverse direction switch engaged (completely engaged), the composite rotation speed received by the forward-reverse direction switch and the travel rotation speed with a forward/reverse travel (positive/negative rotation speed) correspond to each other (being proportional to each other) with a constant speed relationship. On the other hand, in a case of the clutches of the forward-reverse direction switch disengaged (incompletely engaged), the composite rotation speed and the travel rotation speed do not correspond to each other (not being proportional to each other) with an indefinite speed relationship. In a case of at least one of the clutches engaged completely, the abnormality of the rotation detectors can be determined from a relationship of the rotation speed between the first travel rotation detector, the second travel rotation detector, and one of the first composite rotation detector or the second composite rotation detector. Abnormality determination rules for the determiner determining the abnormality of the rotation detectors is described as follows as preferred embodiments.

In a preferred embodiment of a continuously variable powertrain device according to a preferred embodiment of the present invention, the determiner is configured or programmed to, under a condition that the planetary clutch mechanism is engaged: determine that the continuously variable rotation detector is in an abnormal state in a case that a relationship of detected values between the first composite rotation detector and the second composite rotation detector is normal, that a relationship of detected values between the continuously variable rotation detector and the first composite rotation detector is abnormal and that a relationship of detected values between the continuously variable rotation detector and the second composite rotation detector is abnormal.

In this configuration, the first composite rotation detector and the second composite rotation detector are deemed to be normal in a case of respective detected values of the first composite rotation detector and the second composite rotation detector being substantially identical to each other. Furthermore, since a gear ratio of the planetary transmission is defined by the planetary clutch mechanism, it is possible to determine that the continuously variable rotation detector is in an abnormal state in a case that the detected values between the continuously variable rotation detector and the first composite rotation detector differ more than the gear ratio of the planetary transmission, and a case that the detected values between the continuously variable rotation detector and the second composite rotation detector differ more than the gear ratio of the planetary transmission.

For similar reasons, in a preferred embodiment of a continuously variable powertrain device according to a preferred embodiment of the present invention, in a case of a clutch of the forward-reverse direction switch engaged, the determiner is configured or programmed to determine that the first composite rotation detector is in an abnormal state in a case that a relationship of detected values between the continuously variable rotation detector and the second composite rotation detector is normal, that a relationship of detected values between the first composite rotation detector and the continuously variable rotation detector is abnormal and that a relationship of detected values between the first composite rotation detector and the second composite rotation detector is abnormal.

That is, the continuously variable rotation detector and the second composite rotation detector is deemed to be normal in a case that the detected values between the continuously variable rotation detector and the second composite rotation detector differ less than the gear ratio of the planetary transmission. In that state, it is possible to determine that the first composite rotation detector is in an abnormal state in a case that the detected values between the first composite rotation detector and the continuously variable rotation detector differ more than the gear ratio of the planetary transmission and a case that the detected values between the first composite rotation detector and the second composite rotation detector differ more than the gear ratio of the planetary transmission.

For similar reasons, in a preferred embodiment of a continuously variable powertrain device according to a preferred embodiment of the present invention, in a case of a clutch of the forward-reverse direction switch engaged, the determiner is configured or programmed to determine that the second composite rotation detector is in an abnormal state in a case that a relationship of detected values between the continuously variable rotation detector and the first composite rotation detector is normal, that a relationship of detected values between the second composite rotation detector and the continuously variable rotation detector is abnormal and that a relationship of detected values between the second composite rotation detector and the first composite rotation detector is abnormal.

That is, the continuously variable rotation detector and the first composite rotation detector is deemed to be normal in a case that the detected values between the continuously variable rotation detector and the first composite rotation detector differ less than the gear ratio of the planetary transmission. In that state, it is possible to determine that the second composite rotation detector is in an abnormal state in a case that the detected values between the second composite rotation detector and the continuously variable rotation detector differ more than the gear ratio of the planetary transmission and a case that the detected values between the second composite rotation detector and the first composite rotation detector differ more than the gear ratio of the planetary transmission.

In a preferred embodiment of a continuously variable powertrain device according to a preferred embodiment of the present invention, the determiner is configured or programmed to, under a condition that the planetary clutch mechanism is incompletely engaged, determine that both the first composite rotation detector and the second composite rotation detector each are in an abnormal state in a case that the detected values between the first composite rotation detector and the second composite rotation detector differ more than a predetermined value.

In a case of the planetary clutch mechanism being disengaged, it is impossible to calculate the output rotation speed of the planetary transmission from the engine rotation speed and the continuously variable rotation speed due to an indefinite speed relationship between the input rotation speed and the output rotation speed of the planetary transmission. Even in this state, both the first composite rotation detector and the second composite rotation detector can be deemed to be normal in a case of respective detected values of the first composite rotation detector and the second composite rotation detector being substantially identical to each other. On the other hand, at least one of the first composite rotation detector or the second composite rotation detector is deemed to be abnormal in a case of detected values between the first composite rotation detector and the second composite rotation detector being substantially different from each other.

In a preferred embodiment of a continuously variable powertrain device according to a preferred embodiment of the present invention, the determiner is configured or programmed to, under a condition that a clutch of the forward-reverse direction switch is engaged, determine that the first travel rotation detector is in an abnormal state in a case that a relationship of detected values between the second travel rotation detector and the first composite rotation detector is normal, that a relationship of detected values between the first travel rotation detector and the second travel rotation detector is abnormal and that a relationship of detected values between the first travel rotation detector and the first composite rotation detector is abnormal.

In a case of at least one of the clutches of the forward-reverse direction switch engaged completely, an input rotation speed (the composite rotation speed) and an output rotation speed (the travel rotation speed) of the forward-reverse direction switch correspond to each other with a constant speed relationship depending on a gear ratio of the forward-reverse direction switch. Therefore, the first travel rotation detector can be deemed to be in an abnormal state in a case of detected values between the second travel rotation detector and the first composite rotation detector being normal, a case of detected values between the first travel rotation detector and the second travel rotation detector being abnormal, and a case of detected values between the first travel rotation detector and the first composite rotation detector being abnormal.

For similar reasons, in a preferred embodiment of a continuously variable powertrain device according to a preferred embodiment of the present invention, in a case of a clutch of the forward-reverse direction switch engaged, the determiner is configured or programmed to determine that the second travel rotation detector is in an abnormal state in a case that a relationship of detected values between the first travel rotation detector and the first composite rotation detector is normal, that a relationship of detected values between the second travel rotation detector and the first travel rotation detector is abnormal and that a relationship of detected values between the second travel rotation detector and the first composite rotation detector is abnormal.

For similar reasons, in a preferred embodiment of a continuously variable powertrain device according to a preferred embodiment of the present invention, in a case of a clutch of the forward-reverse direction switch engaged, the determiner is configured or programmed to determine that the first composite rotation detector is in an abnormal state in a case that a relationship of detected values between the first travel rotation detector and the second travel rotation detector is normal, that a relationship of detected values between the first composite rotation detector and the first travel rotation detector is abnormal and that a relationship of detected values between the first composite rotation detector and the second travel rotation detector is abnormal.

For similar reasons, in a preferred embodiment of a continuously variable powertrain device according to a preferred embodiment of the present invention, the determiner is configured or programmed to, under a condition that the clutch of the forward-reverse direction switch is incompletely engaged, determine that both the first travel rotation detector and the second travel rotation detector are in an abnormal state in a case that the detected values between the first travel rotation detector and the second travel rotation detector differ more than a predetermined value.

In a case of the clutches of the forward-reverse direction switch being disengaged (incompletely engaged), the input rotation speed (the composite rotation speed) and the output rotation speed (the travel rotation speed) of the forward-reverse direction switch do not correspond to each other with an indefinite speed relationship. In this state, both the first travel rotation detector and the second travel rotation detector can be deemed to be normal in a case of respective detected values of the first travel rotation detector and the second travel rotation detector being substantially identical to each other. On the other hand, at least one of the first travel rotation detector or the second travel rotation detector is deemed to be abnormal in a case of detected values between the first travel rotation detector and the second travel rotation detector being substantially different from each other.

A continuously variable powertrain device for a work vehicle according to a preferred embodiment of the present invention includes a continuously variable transmission to output a continuously shifted motive power while continuously varying a speed of the motive power received from the engine, a planetary transmission to receive the motive power from the engine and the continuously shifted motive power and to output a compound motive power, a planetary clutch mechanism to switch a shift level of the planetary transmission, a forward-reverse direction switch to receive the compound motive power and to output either a forward motive power or a reverse motive power, and a powertrain controller to generate a control signal to control actuation of the continuously variable transmission, the planetary transmission and the forward-reverse direction switch, the powertrain controller being configured or programmed to function as an engine rotation speed obtainer to obtain an engine rotation speed which is an output rotation speed of the engine, a continuously variable rotation speed obtainer to obtain a continuously variable rotation speed which is an output rotation speed of the continuously variable transmission, a composite rotation speed obtainer to obtain a composite rotation speed which is a rotational speed of the compound motive power, and a travel rotation speed obtainer to obtain a travel rotation speed which is a rotation speed of either the forward motive power or the reverse motive power, wherein at least one of the engine rotation speed obtainer, the continuously variable rotation speed obtainer, the composite rotation speed obtainer or the travel rotation speed obtainer is configured or programmed to obtain a corresponding rotation speed based on rotation speed signals from a plurality of rotation detectors to detect a same type of rotation speed.

According to this configuration, at least one of the engine rotation speed (an output rotation speed of the engine) obtained by the engine rotation speed obtainer, the continuously variable rotation speed (an output rotation speed of the continuously variable transmission) obtained by the continuously variable rotation speed obtainer, the composite rotation speed (an output rotation speed of the planetary transmission) obtained by the composite rotation speed obtainer, or the travel rotation speed (a vehicle speed) is obtained with duplicated rotation speed signals from a plurality of the rotation detectors. That is, at least one detection of the rotation speed detections is redundant or dual-systemized (fail-safe). This increases a reliability of detection and realizes a reliable and efficient stepless shift control by the powertrain controller.

In a preferred embodiment of the continuously variable powertrain device of the present invention, the engine rotation speed obtainer is configured or programmed to obtain the engine rotation speed based on a first engine rotation speed signal received from an engine controller for the engine, the continuously variable rotation speed obtainer is configured or programmed to obtain the continuously variable rotation speed based on a continuously variable rotation speed signal received from a continuously variable rotation detector to detect a rotation of an output shaft of the continuously variable transmission, the composite rotation speed obtainer is configured or programmed to obtain the composite rotation speed based on a composite rotation speed signal received from a composite rotation detector to detect a rotation of an output shaft of the planetary transmission, and the travel rotation speed obtainer is configured or programmed to obtain the travel rotation speed based on a travel rotation speed signal received from a travel rotation detector to detect a rotation of an output shaft of the forward-reverse direction switch.

With this configuration, it is possible to detect the rotation speed of the motive power by the engine and the rotation speed of the continuously shifted motive power by the continuously variable transmission both being inputted to the planetary transmission, the output rotation speed of the planetary transmission, and the travel rotation speed as a final shifted result (the vehicle speed) accurately. This enables the powertrain controller to perform an efficient continuously variable speed control (continuous shift control) accurately based on the detection result. The engine rotation speed, the continuously variable rotation speed, the output rotation speed of the planetary transmission, and the travel rotation speed are important factors for the shift control. This means that the accurate continuously variable speed control is impossible in a case of the rotation detectors being broken. Therefore, the fail-safe systems such as duplicating the rotation detector, etc., is necessary.

In a preferred embodiment of a continuously variable powertrain device according to a preferred embodiment of the present invention, the engine rotation speed obtainer is configured or programmed to obtain the engine rotation speed based on a second engine rotation speed signal received from a second engine rotation detector to detect a rotation to input the motive power to an input shaft of the continuously variable transmission.

The engine rotation speed is detected by the engine controller because the engine rotation speed is an important factor to control the engine. However, it is necessary for the engine rotation speed obtainer to detect the engine rotation speed by another detection system in a case of occurring the detection of the engine rotation speed from the engine controller lost. In this configuration, there is additionally provided with a rotation detector to detect a rotation speed of an input shaft as the second engine rotation detector. This achieves a fail-safe for obtaining the engine rotation speed.

In a preferred embodiment of a continuously variable powertrain device according to a preferred embodiment of the present invention, the composite rotation detector includes a first composite rotation detector and a second composite rotation detector, the first composite rotation detector is capable of detecting a rotation of a first rotor rotatable corresponding to a rotation of the output shaft of the planetary transmission, and the second composite rotation detector is capable of detecting a rotation of a second rotor rotatable corresponding to a rotation of the output shaft of the planetary transmission.

With this configuration, the output rotation speed of the planetary transmission is detectable by the first composite rotation detector and the second composite rotation detector. That is, the detection of the output rotation speed of the planetary transmission is redundant, thereby realizing the fail-safe to detect of the output rotation speed of the planetary transmission.

In a preferred embodiment of a continuously variable powertrain device according to a preferred embodiment of the present invention, the first composite rotation detector is capable of detecting a direction of the rotation and the second composite rotation detector is incapable of detecting a direction of the rotation.

In this configuration, the second composite rotation detector is a low-cost detector incapable of detecting a direction of the rotation, thereby reducing costs for achieving a fail-safe.

In a preferred embodiment of a continuously variable powertrain device according to a preferred embodiment of the present invention, the travel rotation detector includes a first travel rotation detector and a second travel rotation detector, the first travel rotation detector is capable of detecting a rotation of a first rotation portion to determine a vehicle speed, and the second travel rotation detector is capable of detecting a rotation of a second rotation portion to determine the vehicle speed.

With this configuration, the travel rotation speed (the vehicle speed) is detectable by the first travel rotation detector and the second travel rotation detector. That is, the detection of the travel rotation speed (the vehicle speed) is redundant, thereby realizing a fail-safe to detect travel rotation speed.

In a preferred embodiment of a continuously variable powertrain device according to a preferred embodiment of the present invention, the first travel rotation detector is capable of detecting a direction of the rotation and the second travel rotation detector is incapable of detecting a direction of the rotation.

In this configuration, the second travel rotation detector is a low-cost detector incapable of detecting a direction of the rotation, thereby reducing costs for providing a fail-safe.

A preferred embodiment of the present invention provides a work vehicle including a continuously variable powertrain device according to one of the preferred embodiments of the present invention described above. The work vehicle is able to achieve actions and effects which are the same as those in the continuously variable powertrain devices.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is an explanatory diagram of a gearshift by the powertrain controller.

DETAILED DESCRIPTION OF THE PREFERRED EMBODIMENTS

Preferred embodiments of the present invention will be described with reference to the drawings showing a tractor as an example of a work vehicle. Note that an arrow "F" in FIG. 1 is defined as a front side corresponding to a front-back direction relative to a body of the work vehicle, an arrow "B" in FIG. 1 is defined as a back side corresponding to the front-back direction relative to the body, an arrow "U" in FIG. 1 is defined as an upper side corresponding to a vertical direction relative to the body, an arrow "D" in FIG. 1 is defined as a lower side corresponding to the vertical direction relative to the body, a near side on the sheet of FIG. 1 is defined as a left side corresponding to a left-right direction relative to the body, and a far side on the sheet of FIG. 1 is defined as a right side corresponding to the left-right direction relative to the body throughout the description below.

Figure 1:
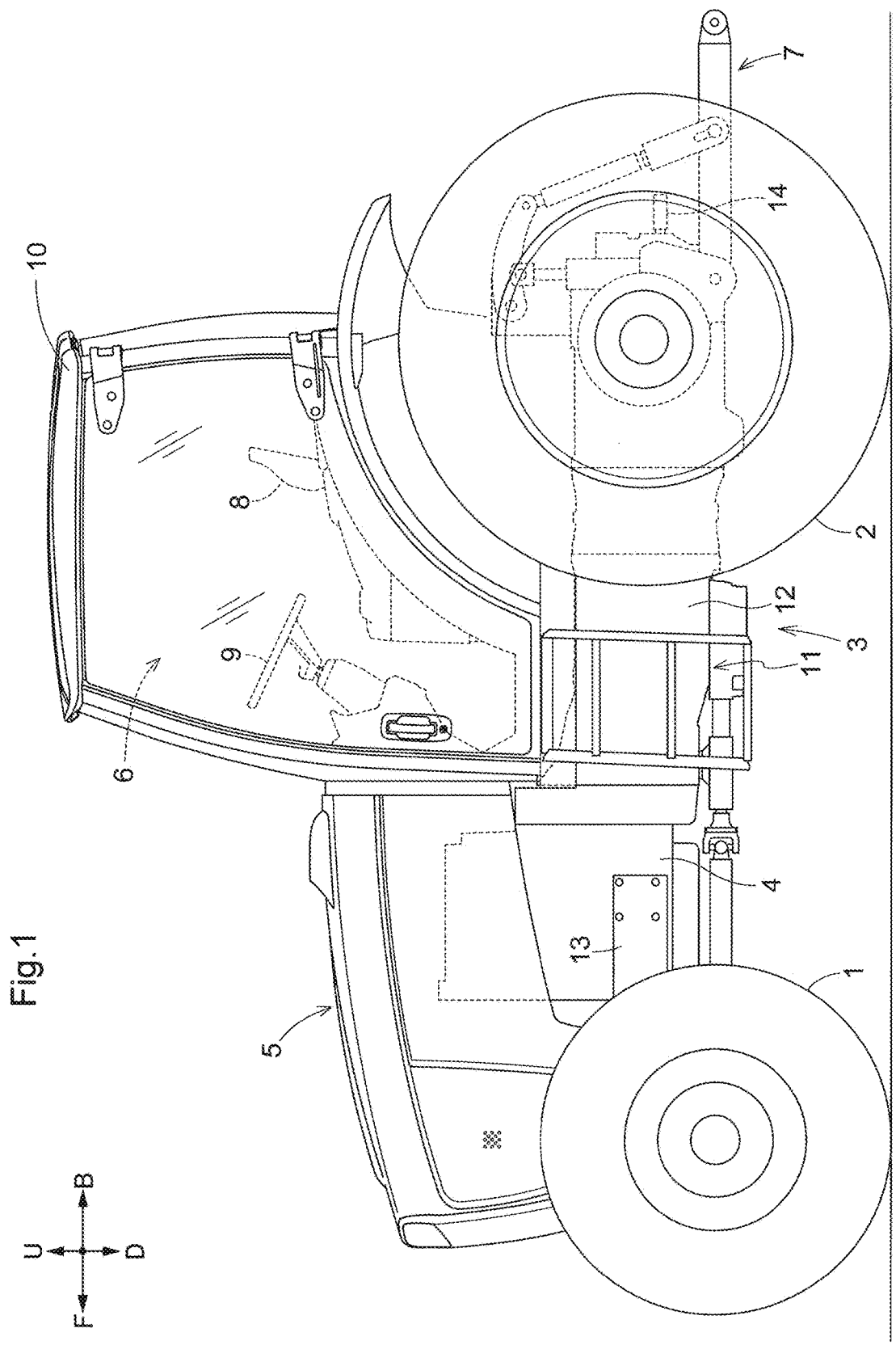
FIG. 1 is a side view of a tractor.

FIG. 1 shows a tractor. This tractor includes a pair of left and right drivable and steerable front wheels 1, a pair of left and right drivable rear wheels 2 and a travel body 3. The travel body 3 is supported by the pair of front wheels 1 and the pair of rear wheels 2. The travel body 3 includes a motive power portion 5 in a front portion thereof. The motive power portion 5 includes an engine 4. The travel body 3 includes a driver's section 6 and a link mechanism 7 in a rear portion thereof. An operator boards the driver's section 6 to perform an operation. The link mechanism 7 connects with a work device such as a rotary cultivator in such a manner that the work device can be lifted or lowered. The driver's section 6 includes a driver's seat 8, a steering wheel 9 to perform a steering operation of the front wheels 1 and a cabin 10 which covers a boarding space. A body frame 11 of the travel body 3 includes the engine 4, a transmission case 12 and a front wheels holder frame 13. A rear portion of the engine 4 is connected with the front portion of the transmission case 12. A bottom portion of the engine 4 is connected with the front wheels holder frame 13. The transmission case 12 is provided with a power take-off shaft 14 in a rear portion thereof. The power take-off shaft 14 transmits a motive power from the engine 4 to the work device connected with the tractor by the link mechanism 7. The front wheels 1 and the rear wheels 2 are unlimited examples of a "travel device".

Figure 2:
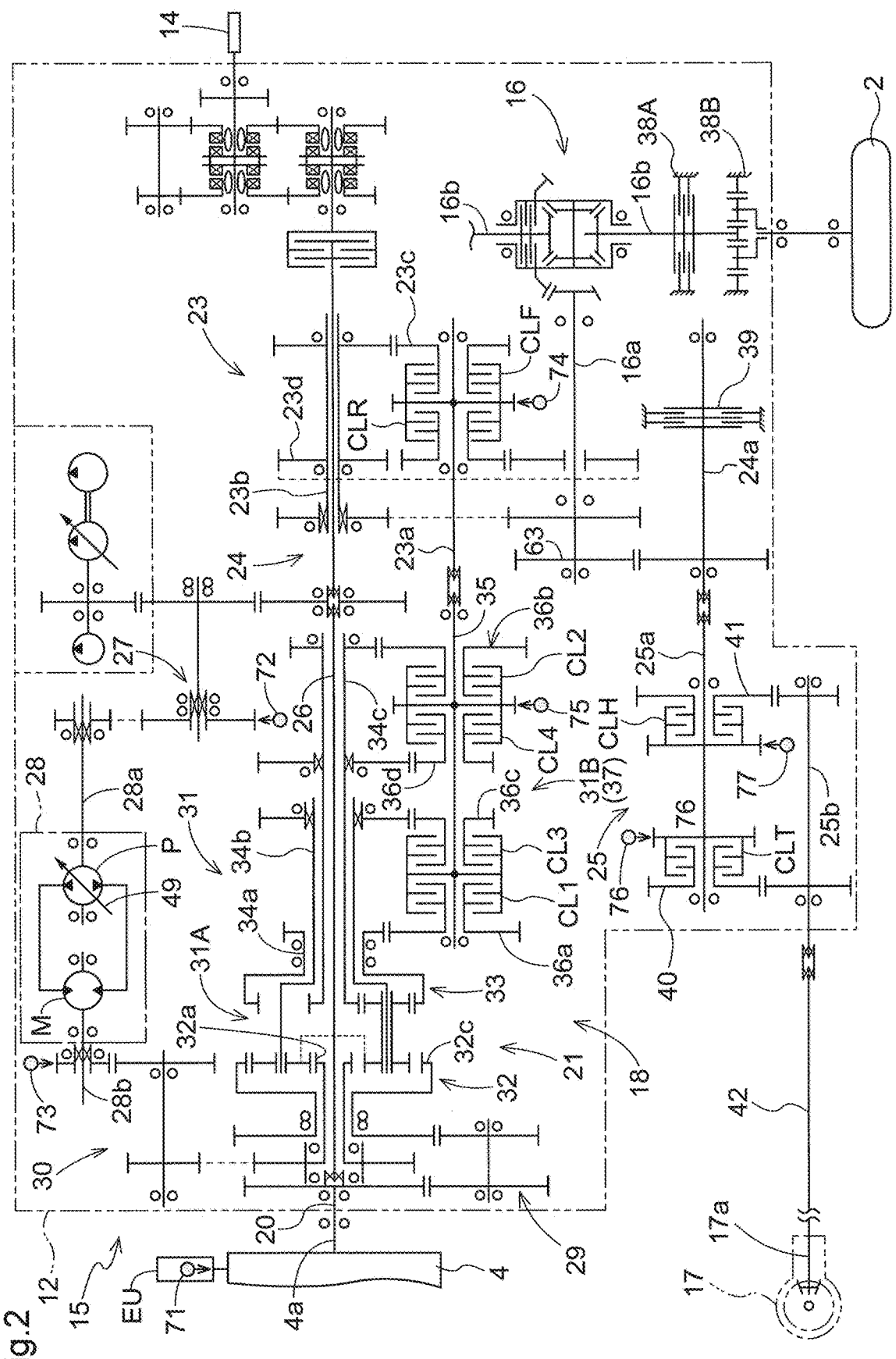
FIG. 2 is a schematic diagram of a continuously variable powertrain device.

As shown in FIG. 2, a powertrain device 15 for travel transmits the motive power from the engine 4 to the front wheels 1 and the rear wheels 2. The powertrain device 15 includes a transmission 18. The transmission 18 transmits the motive power from the engine 4 to a rear wheels differential mechanism 16 and a front wheels differential mechanism 17 while varying a velocity of the motive power. The transmission 18 is housed in the transmission case 12.

As shown in FIG. 2, the transmission 18 includes an input shaft 20, a main transmission portion 21, a forward-reverse direction switch 23, a gear mechanism 24 and a front wheels transmission portion 25. The input shaft 20 is disposed in a front portion of the transmission case 12. The motive power from an output shaft 4a of the engine 4 is transmitted to the input shaft 20. The main transmission portion 21 outputs the motive power from the input shaft 20 to the forward-reverse direction switch 23 while varying the velocity of the motive power. The gear mechanism 24 transmits the motive power from the forward-reverse direction switch 23 to an input shaft 16a of the rear wheels differential mechanism 16. The front wheels transmission portion 25 outputs the motive power from the forward-reverse direction switch 23 to the front wheels differential mechanism 17 while varying the velocity of the motive power.

As shown in FIG. 2, the main transmission portion 21 includes a hydraulic static transmission 28 (HST 28), a planetary transmission 31 and a planetary clutch mechanism 37. The HST 28 receives the motive power from the input shaft 20. The planetary transmission 31 receives the motive power from the input shaft 20 and a continuously shifted motive power output from the HST 28. The planetary clutch mechanism 37 is configured to switch a shift level of the planetary transmission 31.

As shown in FIG. 2, the HST 28 includes a variable capacity hydraulic pump P and a hydraulic motor M driven by a hydraulic fluid from the hydraulic pump P. A rear end portion of the input shaft 20 is connected with a rotation shaft 26. A rear end portion of the rotation shaft 26 is connected with a first gear mechanism 27. The hydraulic pump P is connected with a pump shaft 28a as an input shaft. The pump shaft 28a and the input shaft 20 are connected with each other via the first gear mechanism 27. The HST 28 is configured to change the motive power from the input shaft 20 to either a forward motive power or a reverse motive power by changing an angle of a swash plate of the hydraulic pump P and to vary a rotation speed of either the forward motive power or the reverse motive power. The hydraulic motor M is connected with a motor shaft 28b as an output shaft. The motor shaft 28b of the HST 28 outputs the continuously shifted motive power.

The planetary transmission includes a planetary gearshift portion 31A. The planetary gearshift portion 31A receives the motive power from the input shaft 20 and the continuously shifted motive power from the HST 28. The planetary clutch mechanism 37 which functions as an output portion 31B of the planetary transmission 31 outputs the motive power from the planetary gearshift portion 31A while dividing the motive power into speed ranges of four shift levels.

Figure 3:
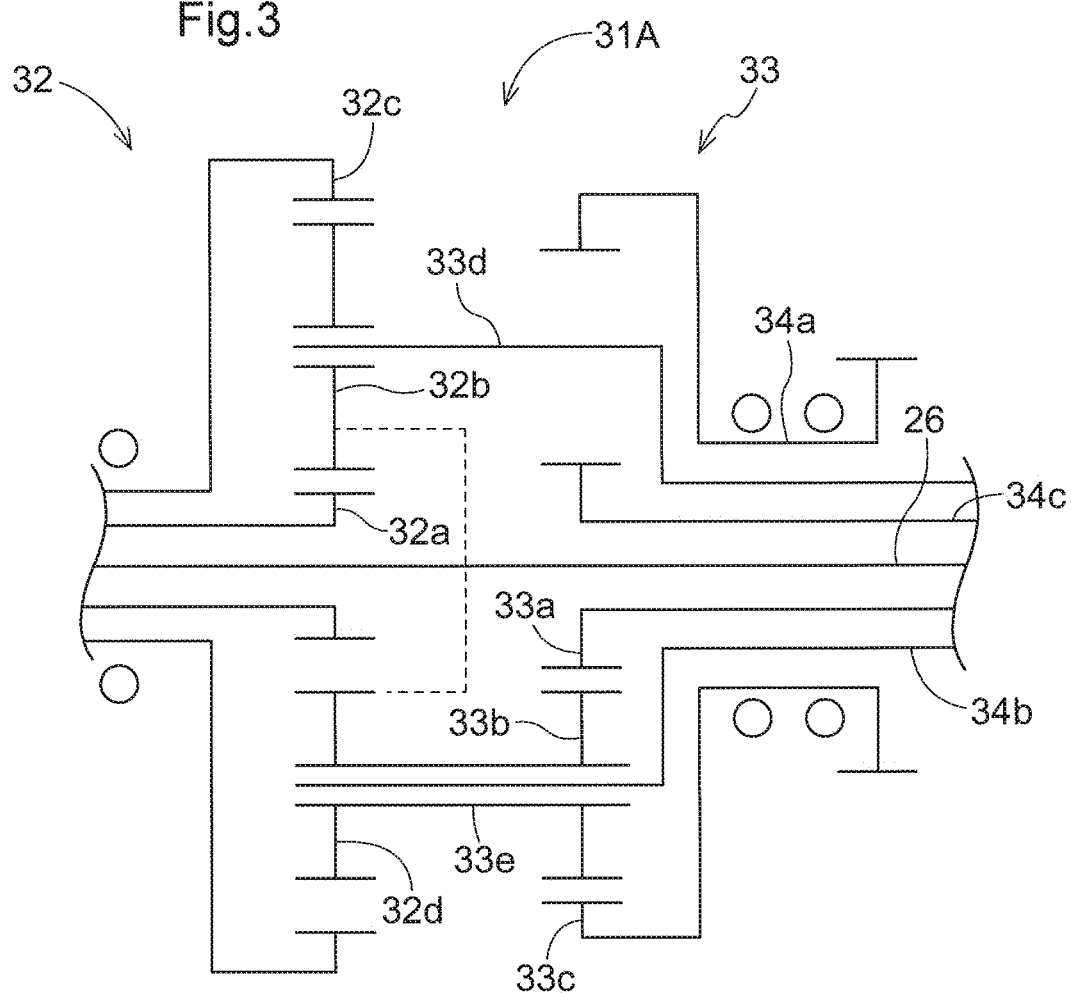
FIG. 3 is a schematic diagram of a planetary transmission.

As shown in FIGS. 2 and 3, the planetary gearshift portion 31A includes a first gearshift portion 32 and a second gearshift portion 33 positioned on a rear side of the first gearshift portion 32. The first gearshift portion 32 includes a first sun gear 32a, a first planetary gear 32b and a first ring gear 32c. The first planetary gear 32b meshes with the first sun gear 32a. The first ring gear 32c has inner teeth which mesh with the first planetary gear 32b. The second gearshift portion 33 includes a second sun gear 33a, a second planetary gear 33b, a second ring gear 33c and a second carrier 33d. The second planetary gear 33b meshes with the second sun gear 33a. The second ring gear 33c has inner teeth which mesh with the second planetary gear 33b. The second carrier 33d holds the second planetary gear 33b.

As shown in FIG. 2, a second gear mechanism 30 is in a space between the first sun gear 32a and the motor shaft 28b of the HST 28. The first sun gear 32a receives the continuously shifted motive power from the HST 28 through the second gear mechanism 30. A third gear mechanism 29 is in a space between the first ring gear 32c and the input shaft 20. The first ring gear 32c receives the motive power from the input shaft 20 through the third gear mechanism 29. As shown in FIGS. 2 and 3, the first gearshift portion 32 includes an interlocking gear 32d. The interlocking gear 32d meshes with the first planetary gear 32b. The interlocking gear 32d and the second planetary gear 33b are interlocked and connected with each other by a coupler 33e. The first gearshift portion 32 and the second gearshift portion 33 are in a configuration of a what is called a compound planetary powertrain.

As shown in FIG. 2, the planetary clutch mechanism 37 includes a first input shaft 34a, a second input shaft 34b, a third input shaft 34c and an output shaft 35. The first input shaft 34a, the second input shaft 34b and the third input shaft 34c are in a configuration of a triple-layered shaft structure. The output shaft 35 is positioned in parallel with the first input shaft 34a, the second input shaft 34b and the third input shaft 34c. As shown in FIG. 3, the first input shaft 34a is connected with the second ring gear 33c. The second input shaft 34b is connected with the second carrier 33d. The third input shaft 34c is connected with the second sun gear 33a. The first input shaft 34a is connected with a first range gear mechanism 36a. A first clutch CL1 is at a position between the first range gear mechanism 36a and the output shaft 35. A second range gear mechanism 36b is connected with the third input shaft 34c. A second clutch CL2 is at a position between the second range gear mechanism 36b and the output shaft 35. A third range gear mechanism 36c is connected with the second input shaft 34b. A third clutch CL3 is at a position between the third range gear mechanism 36c and the output shaft 35. A fourth range gear mechanism 36d is connected with the third input shaft 34c. A fourth clutch CL4 is at a position between the fourth range gear mechanism 36d and the output shaft 35. Each of the first clutch CL1, the second clutch CL2, the third clutch CL3 and the fourth clutch CL4 is a hydraulic clutch and switchable between an engaged state to transmit the motive power and a disengaged state to block the motive power.

In the main transmission portion 21, the hydraulic pump P of the HST 28 receives the motive power from the engine 4 through the input shaft 20, the rotation shaft 26 and the first gear mechanism 27. The motive power received from the hydraulic pump P is changed to the continuously shifted motive power in either a clockwise direction or a counterclockwise direction while the rotation speed being varied by the HST 28. The motor shaft 28b outputs the continuously shifted motive power. The first sun gear 32a of the first gearshift portion 32 receives the continuously shifted motive power from the HST 28 through the second gear mechanism 30. The first ring gear 32c of the first gearshift portion 32 receives the motive power from the engine 4 through the input shaft 20 and the third gear mechanism 29. The continuously shifted motive power from the HST 28 and the motive power from the engine 4 are combined into a compound motive power by the first gearshift portion 32 of the planetary gearshift portion 31A and the second gearshift portion 33. The compound motive power is transmitted from the second gearshift portion 33 to the output portion 31B (the planetary clutch mechanism 37). The output shaft 35 outputs the compound motive power.

The first input shaft 34a of the output portion 31B receives the compound motive power generated by the planetary gearshift portion 31A from the second ring gear 33c. The output shaft 35 outputs the compound motive power with a first gear range through the first range gear mechanism 36a and the first clutch CL1 of the output portion 31B in a case of the first clutch CL1 engaged.

The third input shaft 34c of the output portion 31B receives the compound motive power generated by the planetary gearshift portion 31A from the second sun gear 33a. The output shaft 35 outputs the compound motive power with a second gear range through the second range gear mechanism 36b and the second clutch CL2 of the output portion 31B in a case of the second clutch CL2 engaged.

The second input shaft 34b of the output portion 31B receives the compound motive power generated by the planetary gearshift portion 31A from the second carrier 33d. The output shaft 35 outputs the compound motive power with a third gear range through the third range gear mechanism 36c and the third clutch CL3 of the output portion 31B in a case of the third clutch CL3 engaged.

The output shaft 35 outputs the compound motive power with a fourth gear range through the fourth range gear mechanism 36d and the fourth clutch CL4 of the output portion 31B in a case of the fourth clutch CL4 engaged.

As shown in FIG. 2, the forward-reverse direction switch 23 includes an input shaft 23a and an output shaft 23b. The input shaft 23a is connected with the output shaft 35 of the planetary transmission 31. The output shaft 23b is disposed in parallel with the input shaft 23a. The input shaft 23a is connected with a forward travel clutch CLF and a reverse travel clutch CLR. A forward travel gear interlocking mechanism 23c is disposed at a position between the forward travel clutch CLF and the output shaft 23b. A reverse travel gear interlocking mechanism 23d is disposed at a position between the reverse travel clutch CLR and the output shaft 23b. Each of the forward travel clutch CLF and the reverse travel clutch CLR is a hydraulic clutch and switchable between an engaged state to transmit the motive power and a disengaged state to block the motive power.

In a case of the forward travel clutch CLF engaged, the input shaft 23a and the forward travel gear interlocking mechanism 23c are interlocked with each other and the motive power from the input shaft 23a is transmitted to the output shaft 23b through the forward travel gear interlocking mechanism 23c. This enables the output shaft 23b to output a forward travel motive power. In a case of the reverse travel clutch CLR engaged, the input shaft 23a and the reverse travel gear interlocking mechanism 23d are interlocked with each other and the motive power from the input shaft 23a is transmitted to the output shaft 23b through the reverse travel gear interlocking mechanism 23d. This enables the output shaft 23b to output a reverse travel motive power.

The input shaft 23a of the forward-reverse direction switch 23 receives the compound motive power from the planetary transmission 31. When the forward travel clutch CLF is operated to be engaged, the compound motive power from the input shaft 23a is changed to the forward travel motive power by the forward travel clutch CLF and the forward travel gear interlocking mechanism 23c, and the forward travel motive power is transmitted to the output shaft 23b.

When the reverse travel clutch CLR is operated to be engaged, the compound motive power from the input shaft 23a is changed to the reverse travel motive power by the reverse travel clutch CLR and the reverse travel gear interlocking mechanism 23d, and the reverse travel motive power is transmitted to the output shaft 23b. The forward travel motive power and the reverse travel motive power are transmitted from the output shaft 23b to the rear wheels differential mechanism 16 and the front wheels transmission portion 25 through the gear mechanism 24.

In the rear wheels differential mechanism 16, left and right output shafts 16b receive either the forward travel motive power or reverse travel motive power from the forward-reverse direction switch 23 and transmit the received motive power to the left and right rear wheels 2. The left rear wheel 2 receives the motive power from the left output shaft 16b through a planetary reduction mechanism 38B. The left output shaft 16b is provided with a steering brake 38A. Not shown in diagrams, the transmitting system between the right output shaft 16b and the right rear wheel 2 is also provided with the planetary reduction mechanism 38B and the steering brake 38A, in the same manner as in the transmitting system between the left output shaft 16b and the left rear wheel 2.

As shown in FIG. 2, the front wheels transmission portion 25 includes an input shaft 25a and an output shaft 25b. The input shaft 25a is connected with an output shaft 24a of the gear mechanism 24. The output shaft 25b is positioned in parallel with the input shaft 25a. The input shaft 25a is connected with a speed equalizing clutch CLT and an accelerating clutch CLH. The accelerating clutch CLH is disposed on a rear side of the speed equalizing clutch CLT. Each of the speed equalizing clutch CLT and the accelerating clutch CLH is switchable between an engaged state to transmit the motive power and a disengaged state to block the motive power. A speed equalizing gear mechanism 40 is disposed in a space between the speed equalizing clutch CLT and the output shaft 25b. An accelerating gear mechanism 41 is disposed in a space between the accelerating clutch CLH and the output shaft 25b. The output shaft 24a of the gear mechanism 24 is provided with a parking brake 39.

The motive power from the input shaft 25a is transmitted to the output shaft 25b through the speed equalizing clutch CLT and the speed equalizing gear mechanism 40 in a case of the accelerating clutch CLH engaged. In this case, the speed equalizing gear mechanism 40 causes a speed equalization state in which a circumferential velocity of the front wheels 1 is identical to a circumferential velocity of the rear wheels 2, and the output shaft 25b outputs the motive power to the front wheels 1 under the speed equalization state.

The motive power from the input shaft 25a is transmitted to the output shaft 25b through the accelerating clutch CLH and the accelerating gear mechanism 41 in a case of the accelerating clutch CLH engaged. In this case, the accelerating gear mechanism 41 causes an acceleration state in which the circumferential velocity of the front wheels 1 is faster than the circumferential velocity of the rear wheels 2, and the output shaft 25b outputs the motive power to the front wheels 1 under the acceleration state.

The rotation shaft 42 connects the output shaft 25b with an input shaft 17a of the front wheels differential mechanism 17. The front wheels differential mechanism 17 receives the motive power from the output shaft 25b through the rotation shaft 42.

When the speed equalizing clutch CLT is operated to be engaged, the front wheels 1 and the rear wheels 2 are driven in a state in which the average circumferential velocity of the front wheels 1 is identical with the average circumferential velocity of the rear wheels 2. When the accelerating clutch CLH is operated to be engaged, the front wheels 1 and the rear wheels 2 are driven in a state in which the average circumferential velocity of the front wheels 1 is faster than the average circumferential velocity of the rear wheels 2. Therefore, a turning radius for a turning travel of the travel body 3 in a case of the accelerating clutch CLH engaged is smaller than a turning radius for the turning travel in a case of the speed equalizing clutch CLT engaged.

The powertrain device 15 is provided with a rotation detector group 70. The rotation detector group 70 is configured to detect an engine rotation speed, a continuously variable rotation speed, a composite rotation speed and a travel rotation speed. The engine rotation speed is a rotation speed of the motive power by the engine 4. The continuously variable rotation speed is a rotation speed of the continuously shifted motive power by the HST 28. The composite rotation speed is a rotation speed of the compound motive power by the planetary transmission 31. The travel rotation speed is a rotation speed of either the forward travel motive power or the reverse travel motive power by the forward-reverse direction switch 23. The rotation detector group 70 includes a plurality of rotation detectors disposed at several positions, which rotation detectors include a first engine rotation detector 71 and a second engine rotation detector 72 to detect the engine rotation speed, a continuously variable rotation detector 73 to detect the continuously variable rotation speed, a first composite rotation detector 74 and a second composite rotation detector 75 to detect the composite rotation speed, and a first travel rotation detector 76 and a second travel rotation detector 77 to detect the travel rotation speed. The rotation detectors each with a name of "second" are backup rotation detectors corresponding to the respective rotation detectors each with a name of "first", thereby realizing a redundancy of detecting each of rotation speeds. Note that the rotation detector configured to detect the continuously variable rotation speed is the continuously variable rotation detector 73 only and a corresponding backup rotation detector is not provided. The second rotation detectors are backup detectors for the respective first rotation detectors. In order to reduce costs, the second rotation detectors are low-cost detectors that are incapable of detecting (identifying) a direction of the rotation.

The first engine rotation detector 71 is managed by an engine controller EU which controls the engine 4. The engine rotation speed is strictly managed by the engine controller EU. Accordingly, the engine rotation speed detected by the first engine rotation detector 71 is reliable and the direction of the rotation (forward/reverse rotation) is identifiable. The engine rotation speed is obtained from the engine controller EU via an in-vehicle LAN. The second engine rotation detector 72 detects a gear rotation speed of the first gear mechanism 27 interlocking with the input shaft 20, which gear rotation speed corresponds to the engine rotation speed. The second engine rotation detector 72 is incapable of identifying the direction of the rotation. The engine rotation speed is obtained from a detection signal by the second engine rotation detector 72 in a case that a detection signal of the engine rotation speed from the engine controller EU is lost.

The continuously variable rotation detector 73 detects a gear rotation speed of the second gear mechanism 30 corresponding to the continuously variable rotation speed of the HST 28 and is capable of identifying the direction of the rotation. In a case that the HST 28 is neutral, the continuously variable rotation detector 73 detects a rotation speed of zero.

The first composite rotation detector 74 and the second composite rotation detector 75 each detect an input rotation speed of the forward-reverse direction switch 23. The input rotation speed of the forward-reverse direction switch 23 is the same as an output rotation speed of the planetary transmission 31. The first composite rotation detector 74 detects a rotation speed of a clutch housing which rotates integrally with the input shaft 23a of the forward-reverse direction switch 23. This clutch housing is an unlimited example of a "first rotor". The second composite rotation detector 75 detects a rotation speed of a clutch housing of the planetary clutch mechanism 37 which rotates integrally with the output shaft 35 of the planetary transmission 31. The clutch housing of the planetary clutch mechanism 37 is an unlimited example of a "second rotor". The first composite rotation detector 74 is capable of identifying the direction of the rotation, while the second composite rotation detector 75 is incapable of identifying the direction of the rotation.

The input rotation speed (on an engine-side) of the forward-reverse direction switch 23 is varied by the shift level of the planetary transmission 31. The input rotation speed of the forward-reverse direction switch 23 is calculated from the engine rotation speed, the continuously variable rotation speed of the HST 28 and the shift level of the planetary transmission 31. Note that a possible counter motive force to the output shaft 35 is taken into consideration, that would occur even when all the clutches of the planetary clutch mechanism 37 are disengaged.

The first travel rotation detector 76 and the second travel rotation detector 77 each detect the travel rotation speed which is a rotation speed of a member which determines a vehicle speed. The first travel rotation detector 76 detects a rotation speed of a clutch housing of the speed equalizing clutch CLT which interlocks with the front wheels transmission portion 25. The clutch housing of the speed equalizing clutch CLT is an unlimited example of a "first rotation member". The second travel rotation detector 77 detects a rotation speed of a clutch housing of the accelerating clutch CLH which interlocks with the input shaft 25a of the front wheels transmission portion 25. The clutch housing of the accelerating clutch CLH is an unlimited example of a "second rotation member". The first travel rotation detector 76 is capable of identifying the direction of the rotation, while the second travel rotation detector 77 is incapable of identifying the direction of the rotation.

An output rotation speed of the forward-reverse direction switch 23 is calculated from a detection signal from either the first travel rotation detector 76 or the second travel rotation detector 77. Note that a relationship between the input rotation speed and the output rotation speed of the forward-reverse direction switch 23 varies based on an engagement/disengagement state of the clutches of the forward-reverse direction switch 23.

Figure 4:
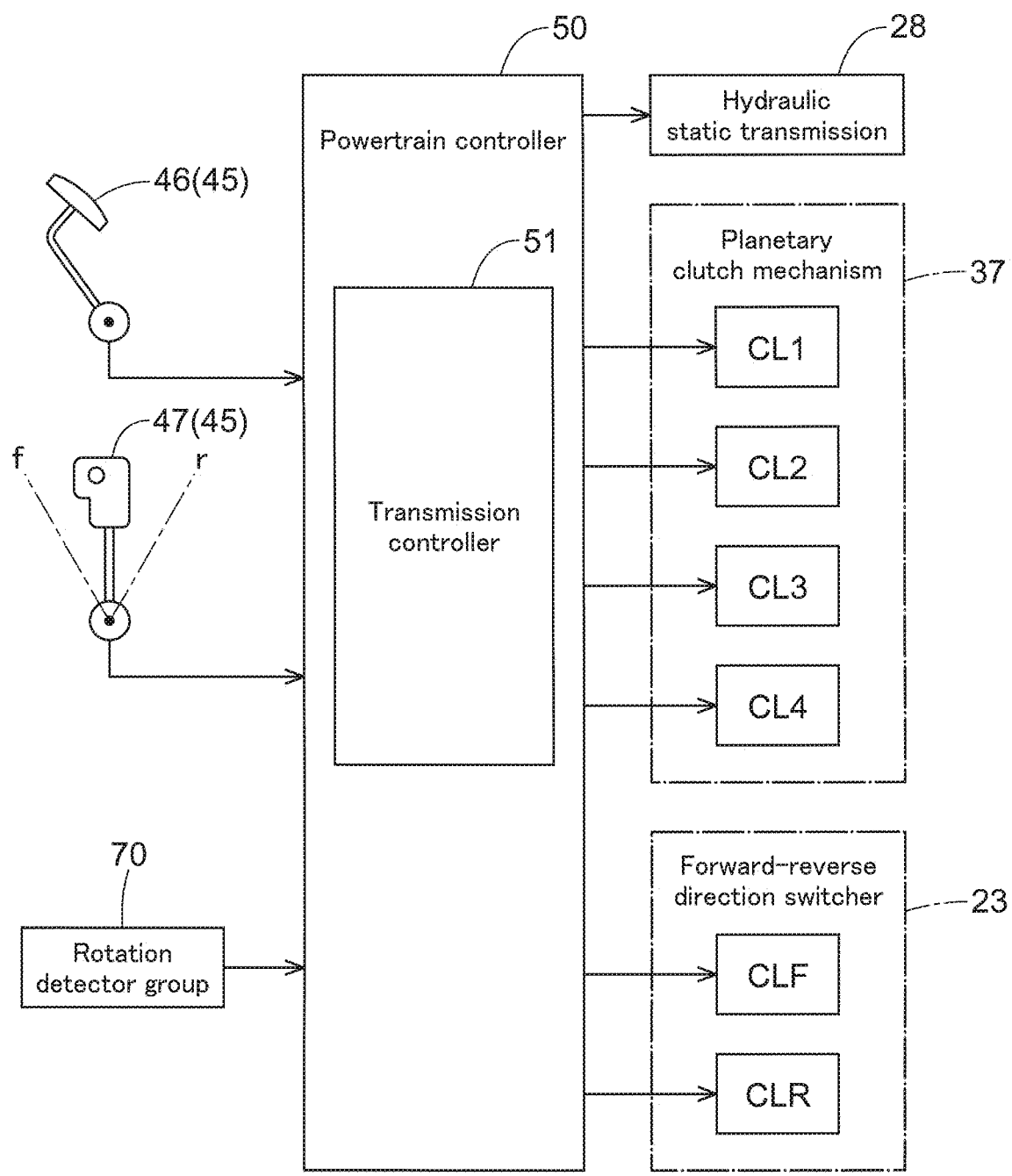
FIG. 4 is a block diagram indicative of input/output devices around a powertrain controller.
Figure 5:
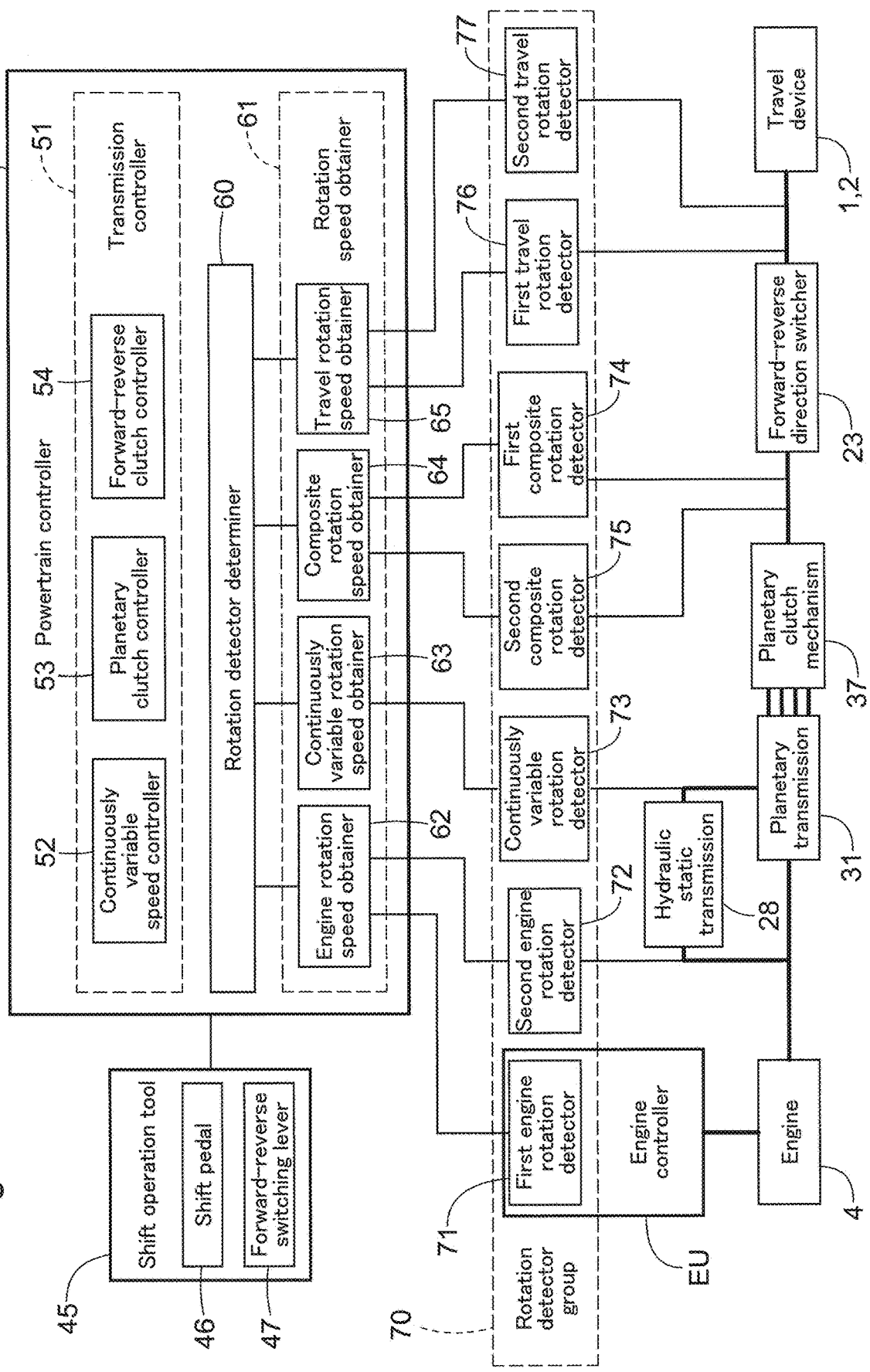
FIG. 5 is a block diagram indicative of control function of the continuously variable powertrain device.

The powertrain controller 50 shown in FIGS. 4 and 5 is configured or programmed to perform a shift control of the continuously variable powertrain device in this preferred embodiment. The driver's section 6 is provided with a shift operation tool 45 including a shift pedal 46 and a forward/reverse switching lever 47. The operator performs a shift operation with the shift pedal 46 and the forward/reverse switching lever 47. The powertrain controller 50 receives operation amounts of the shift pedal 46 and the forward/reverse switching lever 47 as a shift command. The powertrain controller 50 also receives a detection signal (the rotation speed) from the rotation detector group 70. The powertrain controller 50 is configured or programmed to generate a control signal to control actuation of the hydraulic systems such as the HST 28, the planetary clutch mechanism 37, the forward-reverse direction switch 23, etc.

As shown in FIG. 5, the powertrain controller 50 includes a transmission controller 51, the rotation detector determiner 60 and a rotation speed obtainer 61. The rotation detector determiner 60 is an unlimited example of a "determiner".

The transmission controller 51 includes a continuously variable speed controller 52, a planetary clutch controller 53 and a forward-reverse clutch controller 54. The continuously variable speed controller 52 is configured or programmed to generate a control signal to control adjustment of an angle of the swash plate of the HST 28. The planetary clutch controller 53 is configured to generate a clutch control signal to control switching of the shift level of the planetary transmission 31. Specifically, the planetary clutch controller 53 is configured or programmed to generate a clutch control signal to control engagement/disengagement of the clutches (the first clutch CL1, the second clutch CL2, the third clutch CL3 and the fourth clutch CL4) of the planetary clutch mechanism 37. The forward-reverse clutch controller 54 is configured or programmed to generate a clutch control signal to control engagement/disengagement of the clutches (the forward travel clutch CLF and the reverse travel clutch CLR) of the forward-reverse direction switch 23.

The rotation speed obtainer 61 includes an engine rotation speed obtainer 62, a continuously variable rotation speed obtainer 63, a composite rotation speed obtainer 64 and a travel rotation speed obtainer 65. The engine rotation speed obtainer 62 is configured or programmed to obtain detection signals (first engine rotation speed signals as examples of "detected values") from the first engine rotation detector 71 and the second engine rotation detector 72 and to calculate the engine rotation speed (an example of "detected values") of the engine 4. The continuously variable rotation speed obtainer 63 is configured or programmed to obtain a detection signal (a continuously variable rotation speed signal as an example of "detected values") from the continuously variable rotation detector 73 and to calculate the continuously variable rotation speed (an example of "detected values"). The composite rotation speed obtainer 64 is configured or programmed to obtain detection signals (a composite rotation speed signal as an example of "detected values") from the first composite rotation detector 74 and the second composite rotation detector 75 and to calculate the composite rotation speed (an example of "detected values") which is the rotation speed of the output shaft 35 for example. The travel rotation speed obtainer 65 is configured or programmed to obtain detection signals (a travel rotation speed signal indicative of the rotation speed of, for example, the output shaft 23*b* as an example of "detected values") from the first travel rotation detector 76 and the second travel rotation detector 77 and to calculate the travel rotation speed (an example of "detected values"). Although only the continuously variable rotation detector 73 is provided to detect continuously variable rotation speed without a redundant continuously variable rotation detector, the redundant continuously variable rotation detector in this preferred embodiment may be provided for backup of the continuously variable rotation detector 73 as another preferred embodiment.

FIG. 6 shows an explanatory diagram of changing the speed by the transmission controller 51. A vertical axis in FIG. 6 indicates a gear ratio G. The gear ratio G is a ratio of the travel rotation speed to the engine rotation speed (the travel rotation speed/the engine rotation speed). The travel rotation speed (the travel speed and the vehicle speed) is the rotation speed of the input shaft 16*a*. Note that the vertical axis in FIG. 6 also indicates the travel rotation speed (the vehicle speed) V of the input shaft 16*a* because the gear ratio G corresponds to the travel rotation speed (the vehicle speed). A horizontal axis in FIG. 6 indicates a degree of inclination (tilt angle) of the swash plate of the hydraulic pump P of the HST 28, which is a shift state of the HST 28. [N] indicates a neutral state of the HST 28. [−MAX] indicates the shift state outputting the reverse motive power with a maximum speed. [+MAX] indicates the shift state outputting the forward motive power with a maximum speed. [−K] indicates a shift state for switching of the clutch from a reverse direction to a forward direction, being near the position of [−MAX] on the side of [N]. [+K] indicates a shift state for switching of the clutch from the forward direction to the reverse direction, being near the position of [+MAX] on the side of [N]. [G1], [G2], [G3] and [G4] indicate respective predetermined gear ratios G. The transmission controller 51 is configured or programmed to control change of the travel rotation speed (the vehicle speed) V of the input shaft 16*a* while switching the respective engagement/disengagement of the first clutch CL1, the second clutch CL2, the third clutch CL3 and the fourth clutch CL4 based on the gear ratio G and the shift state of the HST 28.

That is, in a state of the first clutch CL1 engaged, the travel rotation speed (the vehicle speed) V is continuously accelerated from zero with the first gear range in response to the HST 28 shifted from [−MAX] to [+MAX]. When the HST 28 is shifted to [+K] and the gear ratio G is accelerated to [G1], the transmission controller 51 switches the first clutch CL1 to a disengaged state and the second clutch CL2 to an engaged state. In a state of the second clutch CL2 engaged, the travel rotation speed (the vehicle speed) V is continuously accelerated with the second gear range in response to the HST 28 shifted from [+MAX] to [−MAX]. When the HST 28 is shifted to [−K] and the gear ratio G is accelerated to [G2], the transmission controller 51 switches the second clutch CL2 to a disengaged state and the third clutch CL3 to an engaged state. In a state of the third clutch CL3 engaged, the travel rotation speed (the vehicle speed) V is continuously accelerated with the third gear range in response to the HST 28 shifted from [−MAX] to [+MAX]. When the HST 28 is shifted to [+K] and the gear ratio G is accelerated to [G3], the transmission controller 51 switches the third clutch CL3 to a disengaged state and the fourth clutch CL4 to an engaged state. In a state of the fourth clutch CL4 engaged, the travel rotation speed (the vehicle speed) V is continuously accelerated with the fourth gear range in response to the HST 28 shifted from [+MAX] to [−MAX].

The rotation detector determiner 60 is configured or programmed to select at least one determination rule from a plurality of abnormality determination rules based on an operation condition (engagement/disengagement) of the planetary clutch mechanism 37 and the forward-reverse direction switch 23. Also, the rotation detector determiner 60 is configured or programmed to determine whether or not each of the rotation detectors is in an abnormal state with utilizing the selected determination rule.

The abnormality of the rotation detector in the rotation detector group 70 determined by the rotation detector determiner 60 is classified as a first abnormal condition for which only a warning notification is to be performed, a second abnormal condition for which a temporary travel is allowed, or a third abnormal condition for which an emergency stop is to be performed.

In a case of a communication from the engine controller EU via the in-vehicle LAN being lost and the periodic detection signal of the engine rotation speed from the first engine rotation detector 71 being lost, the engine rotation speed is obtained from the detection signal from the second engine rotation detector 72, and the shift control by the powertrain controller 50 is continued. Furthermore, in a case that the periodic detection signal from the first engine rotation detector 71 is lost and that the second engine rotation detector 72 has been determined to be in an abnormal state in advance, all the clutches of the planetary clutch mechanism 37 and the forward-reverse direction switch 23 are disengaged, the power transmission from the engine 4 is blocked, and the vehicle stops.

The engine controller EU is configured or programmed to determine whether or not the first engine rotation detector 71 is in an abnormal state. The engine controller EU has an internal backup function to detect the engine rotation speed. The engine controller EU is configured or programmed to transmit an abnormal detection signal to the rotation detector determiner 60 when the engine controller EU determines that the first engine rotation detector 71 is in an abnormal state. That is, the engine controller EU also functions as the rotation detector determiner 60 for the first engine rotation detector 71. When the periodic detection signal is transmitted steadily from the first engine rotation detector 71 of the engine controller EU to the engine rotation speed obtainer 62, the engine rotation speed is not obtained from the second engine rotation detector 72.

In a case that the periodic detection signal is transmitted steadily from the first engine rotation detector 71 of the engine controller EU to the engine rotation speed obtainer 62 and that the detected engine rotation speed from the engine controller EU and the detected engine rotation speed from the second engine rotation detector 72 differ more than a threshold value (an example of a "predetermined value"), the rotation detector determiner 60 determines that the second engine rotation detector 72 is in an abnormal state. In a case that the periodic detection signal of the engine rotation speed from the engine controller EU is lost, the powertrain controller 50 performs the shift control with the detected engine rotation speed from the second engine rotation detector 72 without the rotation detector determiner 60 determining whether the second engine rotation detector 72 is in an abnormal state. In a case that the second engine rotation detector 72 only, of the engine rotation detectors 71, 72, is determined to be in an abnormal state, a travel of the vehicle is continued without any restriction. In this case, a warning that the second engine rotation detector 72 is in an abnormal state is notified.

In a case of one of the clutches of the planetary clutch mechanism 37 being engaged, a first absolute value calculated from the detected engine rotation speed and the detected continuously variable rotation speed, a second absolute value of the composite rotation speed detected from the first composite rotation detector 74 and a third absolute value of the composite rotation speed detected from the second composite rotation detector 75 are obtained. Any two of them are compared (i.e., comparisons are made in three pairs). Then, in a case that at least in one pair, difference is more than a predetermined threshold value (an example of a "predetermined value"), the rotation detector determiner 60 determines that at least one of the continuously variable rotation detector 73, the first composite rotation detector 74 or the second composite rotation detector 75 is in an abnormal state as in the following items (3-1) to (3-3).

(3-1) In a case that a difference between the second absolute value and the third absolute value is within the threshold value, that the difference between the first absolute value and the second absolute value is greater than the threshold value and that the difference between the first absolute value and the third absolute value is greater than the threshold value, the rotation detector determiner 60 determines that the continuously variable rotation detector 73 is in an abnormal state. In other words, in a case that a relationship of detected values between the first composite rotation detector 74 and the second composite rotation detector 75 is normal, that a relationship of detected values between the continuously variable rotation detector 73 and the first composite rotation detector 74 is abnormal and that a relationship of detected values between the continuously variable rotation detector 73 and the second composite rotation detector 75 is abnormal, the rotation detector determiner 60 determines that the continuously variable rotation detector 73 is in an abnormal state.

(3-2) In a case that a difference between the first absolute value and the third absolute value is within the threshold value, that the difference between the second absolute value and the first absolute value is greater than the threshold value and that the difference between the second absolute value and the third absolute value is greater than the threshold value, the rotation detector determiner 60 determines that the first composite rotation detector 74 is in an abnormal state. In other words, in a case that a relationship of detected values between the continuously variable rotation detector 73 and the second composite rotation detector 75 is normal, that a relationship of detected values between the first composite rotation detector 74 and the continuously variable rotation detector 73 is abnormal and that a relationship of detected values between the first composite rotation detector 74 and the second composite rotation detector 75 is abnormal, the rotation detector determiner 60 determines that the first composite rotation detector 74 is in an abnormal state.

(3-3) In a case that a difference between the first absolute value and the second absolute value is within the threshold value, that the difference between the third absolute value and the first absolute value is greater than the threshold value and that the difference between the third absolute value and the second absolute value is greater than the threshold value, the rotation detector determiner 60 determines that the second composite rotation detector 75 is in an abnormal state. In other words, in a case that a relationship of detected values between the continuously variable rotation detector 73 and the first composite rotation detector 74 is normal, that a relationship of detected values between the second composite rotation detector 75 and the continuously variable rotation detector 73 is abnormal and that a relationship of detected values between the second composite rotation detector 75 and the first composite rotation detector 74 is abnormal, the rotation detector determiner 60 determines that the second composite rotation detector 75 is in an abnormal state.

In a case that the continuously variable rotation detector 73 only or the first composite rotation detector 74 only is in an abnormal state, vehicle stops in response to at least one of (i) an operation of the forward-reverse direction switch 23 to be in neutral, or (ii) an operation of disengagement of all the clutches of the planetary clutch mechanism 37 and forward-reverse direction switch 23 while the vehicle speed is in a low-speed condition below a predetermined speed. In a case that the second composite rotation detector 75 only is in an abnormal state, a travel of the vehicle is continued without any restriction. In a case that all of the continuously variable rotation detector 73, the first composite rotation detector 74 and the second composite rotation detector 75 are in an abnormal state, all the clutches of the planetary clutch mechanism 37 and the forward-reverse direction switch 23 are completely disengaged and the vehicle stops.

In a case of the clutches of the planetary clutch mechanism 37 disengaged (incompletely engaged), the rotation detector determiner 60 compares two absolute values of the detected composite rotation speeds respectively from the first composite rotation detector 74 and the second composite rotation detector 75. Then, in a case that the two absolute values differ more than a predetermined threshold value (an example of a "predetermined value"), the rotation detector determiner 60 determines that both the first composite rotation detector 74 and the second composite rotation detector 75 are in an abnormal state. In a case of the clutches of the planetary clutch mechanism 37 being disengaged (incompletely engaged) and the continuously variable rotation detector 73 only being in an abnormal state, or a case of the clutches of the planetary clutch mechanism 37 being disengaged (incompletely engaged) and both the first composite rotation detector 74 and the second composite rotation detector 75 being in an abnormal state, all the clutches of the planetary clutch mechanism 37 and the forward-reverse direction switch 23 are completely disengaged and the vehicle stops.

In a case of one of the clutches of the forward-reverse direction switch 23 being completely engaged, a fourth absolute value of the travel rotation speed detected from the first travel rotation detector 76, a fifth absolute value of the travel rotation speed detected from the second travel rotation detector 77 and a sixth absolute value of the composite rotation speed detected from the first composite rotation detector 74 are obtained. Any two of them are compared (i.e., comparisons are made in three pairs). Then, in a case that at least in one pair, difference is more than a predetermined threshold value (an example of a "predetermined value"), the rotation detector determiner 60 determines that at least one of the first composite rotation detector 74, the first travel rotation detector 76 or the second travel rotation detector 77 is in an abnormal state as in the following items (5-1) to (5-4).

(5-1) In a case that a difference between the fifth absolute value and the sixth absolute value is within the threshold value, that the difference between the fourth absolute value and the fifth absolute value is greater than the threshold value and that the difference between the fourth absolute value and the sixth absolute value is greater than the threshold value, the rotation detector determiner 60 determines that the first travel rotation detector 76 is in an abnormal state. In other words, in a case that a relationship of detected values between the second travel rotation detector 77 and the first composite rotation detector 74 is normal, that a relationship of detected values between the first travel rotation detector 76 and the second travel rotation detector 77 is abnormal and that a relationship of detected values between the first travel rotation detector 76 and the first composite rotation detector 74 is abnormal, the rotation detector determiner 60 determines that the first travel rotation detector 76 is in an abnormal state.

(5-2) In a case that a difference between the fourth absolute value and the sixth absolute value is within the threshold value, that the difference between the fifth absolute value and the fourth absolute value is greater than the threshold value and that the difference between the fifth absolute value and the sixth absolute value is greater than the threshold value, the rotation detector determiner 60 determines that the second travel rotation detector 77 is in an abnormal state. In other words, in a case that a relationship of detected values between the first travel rotation detector 76 and the first composite rotation detector 74 is normal, that a relationship of detected values between the second travel rotation detector 77 and the first travel rotation detector 76 is abnormal and that a relationship of detected values between the second travel rotation detector 77 and the first composite rotation detector 74 is abnormal, the rotation detector determiner 60 determines that the second travel rotation detector 77 is in an abnormal state.

(5-3) In a case that a difference between the fourth absolute value and the fifth absolute value is within the threshold value, that the difference between the sixth absolute value and the fourth absolute value is greater than the threshold value and that the difference between the sixth absolute value and the fifth absolute value is greater than the threshold value, the rotation detector determiner 60 determines that the first composite rotation detector 74 is in an abnormal state. In other words, in a case that a relationship of detected values between the first travel rotation detector 76 and the second travel rotation detector 77 is normal, that a relationship of detected values between the first composite rotation detector 74 and the first travel rotation detector 76 is abnormal and that a relationship of detected values between the first composite rotation detector 74 and the second travel rotation detector 77 is abnormal, the rotation detector determiner 60 determines that the first composite rotation detector 74 is in an abnormal state.

(5-4) In a case that there is a discrepancy that threshold condition between the fourth absolute value, the fifth absolute value, and the sixth absolute value is not met, the rotation detector determiner 60 determines that all of the first travel rotation detector 76, the second travel rotation detector 77, and the first composite rotation detector 74 are in an abnormal state.

In a case that the first composite rotation detector 74 only is in an abnormal state, vehicle stops in response to at least one of (i) an operation of the forward-reverse direction switch 23 to be in neutral, or (ii) an operation of disengagement of all the clutches of the planetary clutch mechanism 37 and forward-reverse direction switch 23 while the vehicle speed is in allow-speed condition below a predetermined speed. In a case that the first travel rotation detector 76 only is in an abnormal state, all the clutches of the planetary clutch mechanism 37 are disengaged after the forward-reverse direction switch 23 is operated to be neutral. In a case that the second travel rotation detector 77 only is in an abnormal state, a travel of the vehicle is continued without any restriction. In a case that all of the first travel rotation detector 76, the second travel rotation detector 77, and the first composite rotation detector 74 are in an abnormal state, all the clutches of the planetary clutch mechanism 37 and the forward-reverse direction switch 23 are completely disengaged and the vehicle stops.

In a case of the clutches of the forward-reverse direction switch 23 disengaged (incompletely engaged), the rotation detector determiner 60 compares two absolute values of the detected travel rotation speeds respectively from the first travel rotation detector 76 and the second travel rotation detector 77. Then, in a case that the two absolute values differ more than a predetermined threshold value (an example of a "predetermined value"), the rotation detector determiner 60 determines that both the first travel rotation detector 76 and the second travel rotation detector 77 are in an abnormal state. In a case of the clutches of the forward-reverse direction switch 23 being disengaged (incompletely engaged) and the first composite rotation detector 74 only being in an abnormal state, all the clutches of the planetary clutch mechanism 37 and the forward-reverse direction switch 23 are completely disengaged and the vehicle stops.

In a case that a rotation speed of the corresponding rotation detector indicates a value of zero under a situation that detection targets to be detected by rotation detectors are considered to be rotating, a disconnection of harnesses is assumed. Particularly, in a case that one of the clutches of the planetary clutch mechanism 37 and one of the clutches of the forward-reverse direction switch 23 are not engaged, the first travel rotation detector 76 and the second travel rotation detector 77 are not able to detect correct rotation speed. Therefore, a disconnection check is performed after confirming the engaged state of the planetary clutch mechanism 37 and the forward-reverse direction switch 23.

The abnormality determination of the rotation detector group 70 is skipped under the following situations:
(i) the vehicle speed is in a low speed which deteriorates a detecting accuracy deteriorates;
(ii) the engine rotation speed falls near a range which the engine stalls due to some loads (in this case, the abnormality determination process is skipped to prioritize a control process for avoiding the engine stall); or
(iii) a rotation speed detected by a specific rotation detector deviate from a predetermined threshold condition.

Other Preferred Embodiments

The present invention is not limited to the configuration illustrated in the above preferred embodiments. Other representative preferred embodiments of the present invention will be described below.

The HST 28 is an example of a continuously variable transmission. A continuously variable transmission may be a belt-pulley-based continuously variable transmission or a friction-disk-based continuously variable transmission.

Position of the rotation detectors of the rotation detector group 70 is not limited to the above-described preferred embodiments. The rotation detectors may be positioned anywhere capable of detecting the substantially identical rotation speed with the above-described preferred embodiments.

A function of the powertrain controller 50 may be integrated with other functions and may be divided into a plurality of functions. A specified control function may be installed in a control unit (ECU) other than the powertrain controller 50.

With the above-described configuration in this preferred embodiments, the planetary transmission 31 is configured to divide the motive power into four shift levels. The shift levels divided by the planetary transmission 31 may be less than four shift levels or more than four shift levels.

With the above-described configuration in this preferred embodiments, travel device is the front wheels 1 and the rear wheels 2. The travel device may be crawlers or a combination of wheels and semi-crawlers.

With the above-described configuration in this preferred embodiments, the shift operation tool 45 includes the shift pedal 46. The shift operation tool 45 may include a shift lever instead of (or other than) the shift pedal 46.

With the above-described configuration in this preferred embodiments, the shift operation tool 45 includes the forward/reverse switching lever 47. The shift operation tool 45 may include a forward/reverse switching pedal instead of (or other than) the forward/reverse switching lever 47.

Note that the configuration disclosed in the above preferred embodiments (including other preferred embodiments; the same applies to the following) may be combined with configurations disclosed in other preferred embodiments, as long as no contradiction arises. The preferred embodiments disclosed herein are illustrative. Preferred embodiments of the present invention are not limited thereto, and can be altered without departing from the object of the present invention.

Preferred embodiments of the present invention are applicable to continuously variable powertrain devices, for work vehicles, including hydraulic static transmissions, and planetary transmissions and to various work vehicles including the continuously variable powertrain devices.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A continuously variable powertrain device, for a work vehicle, to transmit a motive power from an engine to a travel device, the continuously variable powertrain device comprising: a continuously variable transmission to output a continuously shifted motive power while continuously varying a speed of the motive power received from the engine;
   a planetary transmission to receive the motive power from the engine and the continuously shifted motive power and to output a compound motive power;
   a planetary clutch mechanism to switch a shift level of the planetary transmission;
   a forward-reverse direction switch to receive the compound motive power and to output either a forward motive power or a reverse motive power;
   a rotation detector group including a plurality of rotation detectors to detect an engine rotation speed, a continuously variable rotation speed, a composite rotation speed and a travel rotation speed, the engine rotation speed being an output rotation speed of the engine, the continuously variable rotation speed being a rotation speed of the continuously shifted motive power, the composite rotation speed being a rotation speed of the compound motive power, the travel rotation speed being a rotation speed of either the forward motive power or the reverse motive power; and
   a powertrain controller configured or programmed to:
      generate a control signal to control actuation of the continuously variable transmission, the planetary transmission, and the forward-reverse direction switch based on a shift command by using the engine rotation speed, the continuously variable rotation speed, the composite rotation speed, and the travel rotation speed; and
      function as a determiner to determine whether or not the rotation detector group is in an abnormal state by using at least one determination rule selected from a plurality of abnormality determination rules based on an operation condition with the planetary clutch mechanism and the forward-reverse direction switch.

2. The continuously variable powertrain device according to claim 1, wherein the determiner is configured or programmed to select the determination rule and determine whether or not the rotation detector group is in an abnormal state based on the engine rotation speed.

3. The continuously variable powertrain device according to claim 1, wherein the determiner is configured or programmed to classify the abnormality of the rotation detector group as a first abnormal condition for which only a warning notification is to be performed, a second abnormal condition for which a temporary travel is allowed, or a third abnormal condition for which an emergency stop is to be performed.

4. The continuously variable powertrain device according to claim 1, wherein
   the rotation detector group includes:
      a first engine rotation detector to detect the engine rotation speed;
      a second engine rotation detector to detect a rotation speed of an input shaft receiving the motive power from the engine as the engine rotation speed;
      a continuously variable rotation detector to detect the continuously variable rotation speed;
      a first composite rotation detector to detect the composite rotation speed;
      a second composite rotation detector to detect the composite rotation speed;
      a first travel rotation detector to detect the travel rotation speed; and
      a second travel rotation detector to detect the travel rotation speed.

5. The continuously variable powertrain device according to claim 4, wherein
   the determiner is configured or programmed to, under a condition that the planetary clutch mechanism is engaged:
      determine that the continuously variable rotation detector is in an abnormal state in a case that a relationship of detected values between the first composite rotation detector and the second composite rotation detector is normal, that a relationship of detected values between the continuously variable rotation detector and the first composite rotation detector is abnormal and that a relationship of detected values between the continuously variable rotation detector and the second composite rotation detector is abnormal;
  determine that the first composite rotation detector is in an abnormal state in a case that a relationship of detected values between the continuously variable rotation detector and the second composite rotation detector is normal, that a relationship of detected values between the first composite rotation detector and the continuously variable rotation detector is abnormal and that a relationship of detected values between the first composite rotation detector and the second composite rotation detector is abnormal; and
  determine that the second composite rotation detector is in an abnormal state in a case that a relationship of detected values between the continuously variable rotation detector and the first composite rotation detector is normal, that a relationship of detected values between the second composite rotation detector and the continuously variable rotation detector is abnormal and that a relationship of detected values between the second composite rotation detector and the first composite rotation detector is abnormal.

6. The continuously variable powertrain device according to claim 5, wherein the determiner is configured or programmed to, under a condition that the planetary clutch mechanism is incompletely engaged, determine that both the first composite rotation detector and the second composite rotation detector are in an abnormal state in a case that the detected values between the first composite rotation detector and the second composite rotation detector differ more than a predetermined value.

7. The continuously variable powertrain device according to claim 5, wherein
  the determiner is configured or programmed to, under a condition that a clutch of the forward-reverse direction switch is engaged:
    determine that the first travel rotation detector is in an abnormal state in a case that a relationship of detected values between the second travel rotation detector and the first composite rotation detector is normal, that a relationship of detected values between the first travel rotation detector and the second travel rotation detector is abnormal and that a relationship of detected values between the first travel rotation detector and the first composite rotation detector is abnormal;
    determine that the second travel rotation detector is in an abnormal state in a case that a relationship of detected values between the first travel rotation detector and the first composite rotation detector is normal, that a relationship of detected values between the second travel rotation detector and the first travel rotation detector is abnormal and that a relationship of detected values between the second travel rotation detector and the first composite rotation detector is abnormal; and
    determine that the first composite rotation detector is in an abnormal state in a case that a relationship of detected values between the first travel rotation detector and the second travel rotation detector is normal, that a relationship of detected values between the first composite rotation detector and the first travel rotation detector is abnormal and that a relationship of detected values between the first composite rotation detector and the second travel rotation detector is abnormal.

8. The continuously variable powertrain device according to claim 7, wherein the determiner is configured or programmed to, under the condition that the clutch of the forward-reverse direction switch is incompletely engaged, determine that both the first travel rotation detector and the second travel rotation detector are in an abnormal state in a case that the detected values between the first travel rotation detector and the second travel rotation detector differ more than a predetermined value.

9. A work vehicle comprising the continuously variable powertrain device according to claim 1.

10. A continuously variable powertrain device, for a work vehicle, to transmit a motive power from an engine to a travel device, the continuously variable powertrain device comprising:
  a continuously variable transmission to output a continuously shifted motive power while continuously varying a speed of the motive power received from the engine;
  a planetary transmission to receive the motive power from the engine and the continuously shifted motive power and to output a compound motive power;
  a planetary clutch mechanism to switch a shift level of the planetary transmission;
  a forward-reverse direction switch to receive the compound motive power and to output either a forward motive power or a reverse motive power; and
  a powertrain controller to generate a control signal to control actuation of the continuously variable transmission, the planetary transmission and the forward-reverse direction switch, the powertrain controller being configured or programmed to function as:
    an engine rotation speed obtainer to obtain an engine rotation speed which is an output rotation speed of the engine;
    a continuously variable rotation speed obtainer to obtain a continuously variable rotation speed which is an output rotation speed of the continuously variable transmission;
    a composite rotation speed obtainer to obtain a composite rotation speed which is a rotational speed of the compound motive power; and
    a travel rotation speed obtainer to obtain a travel rotation speed which is a rotation speed of either the forward motive power or the reverse motive power; wherein
  at least one of the engine rotation speed obtainer, the continuously variable rotation speed obtainer, the composite rotation speed obtainer or the travel rotation speed obtainer is configured or programmed to obtain a corresponding rotation speed based on rotation speed signals from a plurality of rotation detectors to detect a same type of rotation speed.

11. The continuously variable powertrain device according to claim 10, wherein
  the engine rotation speed obtainer is configured or programmed to obtain the engine rotation speed based on a first engine rotation speed signal received from an engine controller for the engine;
  the continuously variable rotation speed obtainer is configured or programmed to obtain the continuously variable rotation speed based on a continuously variable rotation speed signal received from a continuously variable rotation detector to detect a rotation of an output shaft of the continuously variable transmission;

the composite rotation speed obtainer is configured or programmed to obtain the composite rotation speed based on a composite rotation speed signal received from a composite rotation detector to detect a rotation of an output shaft of the planetary transmission; and the travel rotation speed obtainer is configured or programmed to obtain the travel rotation speed based on a travel rotation speed signal received from a travel rotation detector to detect a rotation of an output shaft of the forward-reverse direction switch.

12. The continuously variable powertrain device according to claim 11, wherein the engine rotation speed obtainer is configured or programmed to obtain the engine rotation speed based on a second engine rotation speed signal received from a second engine rotation detector to detect a rotation of an input shaft to input the motive power to the continuously variable transmission.

13. The continuously variable powertrain device according to claim 11, wherein the composite rotation detector includes a first composite rotation detector and a second composite rotation detector;

the first composite rotation detector is to detect a rotation of a first rotor rotatable corresponding to a rotation of the output shaft of the planetary transmission; and the second composite rotation detector is to detect a rotation of a second rotor rotatable corresponding to a rotation of the output shaft of the planetary transmission.

14. The continuously variable powertrain device according to claim 13, wherein the first composite rotation detector is capable of detecting a direction of the rotation; and the second composite rotation detector is incapable of detecting a direction of the rotation.

15. The continuously variable powertrain device according to claim 11, wherein the travel rotation detector includes a first travel rotation detector and a second travel rotation detector;

the first travel rotation detector is to detect a rotation of a first rotatable portion to determine a vehicle speed; and the second travel rotation detector is to detect a rotation of a second rotatable portion to determine the vehicle speed.

16. The continuously variable powertrain device according to claim 15, wherein the first travel rotation detector is capable of detecting a direction of the rotation; and the second travel rotation detector is incapable of detecting a direction of the rotation.

17. A work vehicle comprising the continuously variable powertrain device according to claim 10.

* * * * *